Jan. 30, 1968 A. C. HADDY 3,366,382

APPARATUS FOR RECORDING SOUND ON OR REPRODUCING SOUND FROM DISC RECORDS

Filed May 7, 1965

3,366,382
Patented Jan. 30, 1968

3,366,382

APPARATUS FOR RECORDING SOUND ON OR REPRODUCING SOUND FROM DISC RECORDS

Arthur Charles Haddy, London, England, assignor to Decca Limited, London, England, a British company Filed May 7, 1965, Ser. No. 454,035
Claims priority, application Great Britain, May 15, 1964, 20,423/64
4 Claims. (Cl. 274—23)

ABSTRACT OF THE DISCLOSURE

In a phonograph pick-up in which the pick-up arm is mounted on a uni-pivot to permit rotation and tilting in any direction, eddy current damping of motion of the pick-up arm is effected using a permanent magnet in the fixed support for the arm and a part spherical conductive element with its center at the pivot point, the conductive element extending between the poles of the magnet.

Figures 1, 2:
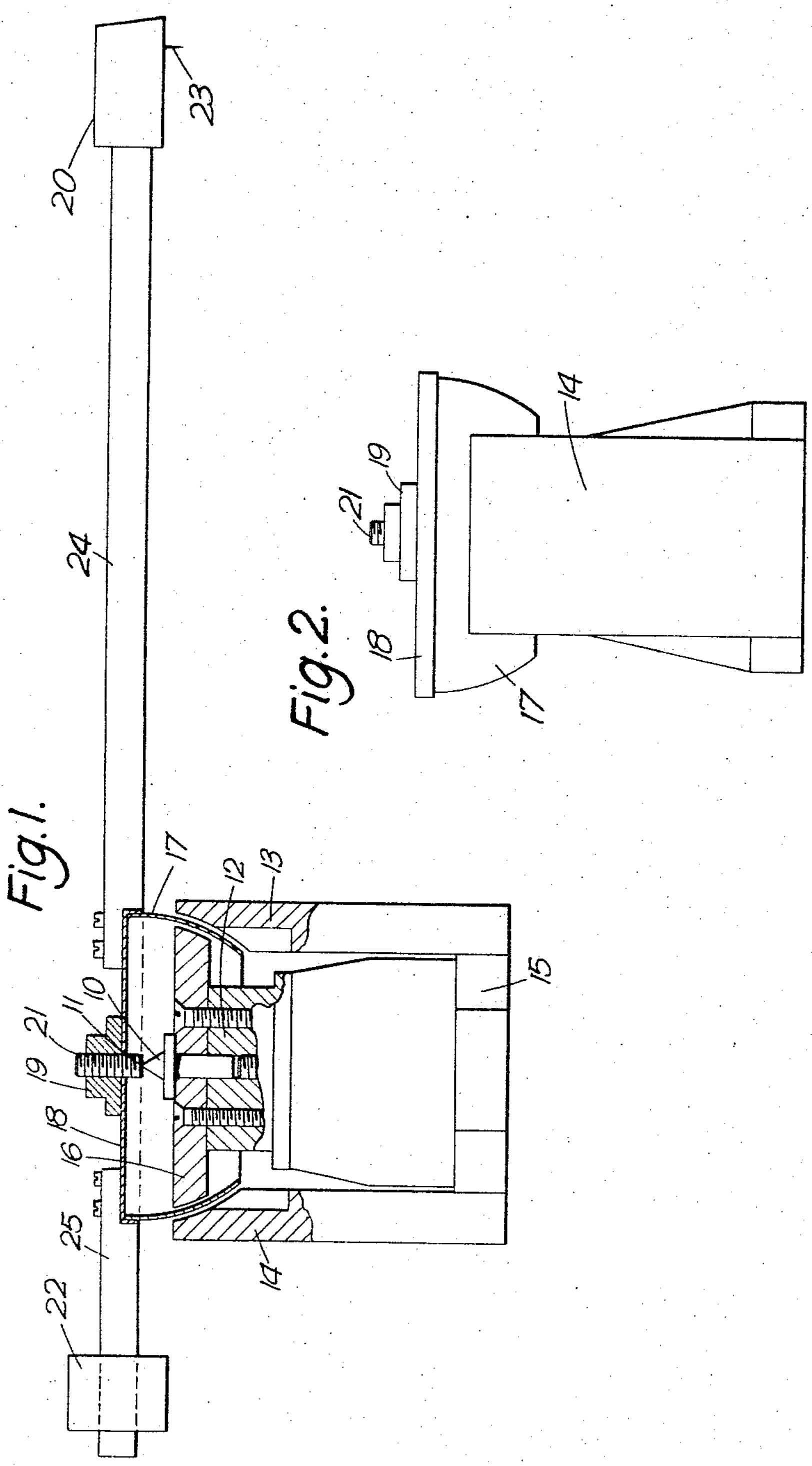

This invention relates to apparatus for recording sound on or reproducing sound from disc records.

In a phonograph for reproducing sound from disc records the pick-up arm carrying the stylus has to be pivotally mounted for rotation about an upright axis so that the stylus can traverse across the record and also is pivoted about a horizontal axis to enable the stylus to be lifted off the record. A very light tracking weight is used in modern pick-ups to improve the quality of reproduction and to reduce record wear. In such a pick-up the compliance in the pick-up head together with the effective mass of the arm gives a low frequency resonance, called "tone arm resonance" which may cause distortion. Furthermore, with a very light tracking weight, it is difficult to put the stylus onto the record without bounce. It is one of the objects of the present invention to provide a means for damping movement of the pick-up arm particularly in the vertical plane.

According to one aspect of the present invention, a pick-up arm assembly for a phonograph having a pick-up arm pivotally mounted on a support for movement about the support so that the pick-up can traverse across the record and can be lifted off the record is characterised by eddy current damping means, comprising a magnet and a co-operating conductive element movable across the field of the magnet, arranged, one on said arm and the other on said support to damp vertical movement of the pick-up arm. The eddy current damping means enable the vertical movements of the pick-up to be damped without affecting the tracking and can be used on a pick-up assembly with a low tracking weight. The lateral movement can be damped if required, in the known way but very conveniently the eddy current damping means are arranged to effect damping of both vertical and lateral movement of the pick-up arm.

Heretofore, in order to obtain adequate damping of the lateral movement, it has been the practice to use two separate pivots for the two axes of movement and to pack a suitable viscous substance such as a silicone grease, around a spindle forming a pivot for lateral movement. With eddy current damping, this is no longer necessary. Conveniently the pick-up arm is carried on an upright pivot pin with a pivot point on its upper end, the pick-up arm being supported on said point to be rotatable about the axis of the pivot pin and to be capable of tilting about the point. Conveniently the conducting member is of sheet material in the form of a part spherical surface attached to said arm with the centre of the sphere at the pivot point, the surface extending between the poles of a magnet. The slow rotational movement as the pick-up arm traverses across the disc will not cause any appreciable damping but the more rapid vertical movements of the pick-up arm and any rapid lateral movement of the pick-up (as for example when moving it manually) can be substantially damped using this construction. The magnet is conveniently of the kind having a central pole axially aligned with the pivot axis co-operating with two poles on diametrically opposite sides of the pivot axis, the conductive member lying between the central and the outer poles. It has been found that a permanent magnet with its poles close together will give adequate damping. The conductive member is conveniently made of copper and may constitute part of a central assembly for fitting on the pivot point which assembly carries two opposite directed arms, one extending to the pick-up and the other carrying a balance weight.

Instead of having a pivot point as described above, the pick-up arm may be mounted for movement about separate horizontal and upright axes in the known manner and according to another aspect of the invention in a pick-up arm assembly having a pick-up arm pivotally mounted for movement about horizontal axes on a support mounted for rotation about an upright axis, eddy current damping means are provided comprising a permanent magnet and a co-operating conductive element movable across the field of the magnet and arranged, one on said arm the other on said support, to damp movement of the pick-up arm about the horizontal axis.

Preferably however the eddy current damping is used to damp not only the vertical movement of the pickup arm but also the lateral movement, that is rotation about the vertical axis instead of using silicone grease or similar material about the spindle, as has heretofore been the practice. This avoids any necessity for the careful sealing of the assembly such as has been required heretofore to prevent leakage of the grease.

The invention furthermore includes within its scope a phonograph having a pick-up assembly as described above.

In apparatus for recording sound on a disc record, a similar problem arises of damping vertical movement of the cutter arm. The cutter arm, in recording apparatus, is mounted on a carriage which is traversed by a lead screw for movement across the surface of the disc and it has been possible, unlike a phonograph, to provide oil damping for the vertical movement of the cutter arm. This is not wholly satisfactory since the damping effect varies with temperature and, according to a further feature of the present invention, in sound recording apparatus having a cutter arm pivotally mounted on a carriage for movement about a horizontal axis, eddy current damping means comprising a magnet and a co-operating conductive element movable across the field of the magnet are arranged, one on said arm and the other on said carriage, to damp movement of the cutter arm about the horizontal axis.

The following is a description of one embodiment of the invention reference being made to the accompanying drawings in which—

FIGURE 1 is a view in elevation, partly in section, of a pick-up assembly for a phonograph; and FIGURE 2 is an end view of the pivot assembly and damping system of FIGURE 1 with the pick-up arm and balance weight arm removed.

Referring to the drawings there is shown a pick-up arm assembly in which an upright pivot pin 10 having a pivot point 11 at its top end is supported in a central upright pole 12 of a permanent magnet. This permanent magnet has two further poles 13, 14 arranged on diametrically opposite sides of the central pole 12 and joined thereto by a yoke 15. Secured on the central pole 12 is a pole piece 16 which extends radially outwardly from the pivot pin to positions closely adjacent the ends of the poles 13, 14. A part spherical copper bowl 17 shaped to have its centre at the pivot point 11 lies in the gap between the central pole piece 16 and the outer poles 13, 14. This copper bowl 16 is secured to a plate 18 carrying a central bush 19 which is tapped to receive a threaded stud 21, the lower end of which seats on the point 11 of the pivot pin 10. The plate 18 and bowl 17 can thus rock freely about the pivot point 11. Secured on the plate 18 is an arm 24 carrying the pick-up head which is illustrated diagrammatically at 20. Also secured on the plate 18 is a balance weight arm 25 carrying an adjustable balance weight 22. The balance weight arm 25 and pick-up arm 24 extend in diametrically opposite directions and the balance weight can be adjusted in the known manner to balance nearly all the weight of the pick-up arm so that a stylus 23 in the pick-up head bears on record with the required small tracking weight.

It will be seen that any tilting or rotational movement of the pick-up arm about the pivot point 11 causes movement of the part spherical bowl 17 in the magnetic field and hence such movement is damped by the eddy currents set up in the bowl 17. The damping is thus effective both for vertical movements of the pick-up head and for lateral movements. It has found that it is readily possible with this construction to get substantial damping such that it is possible to dispense with the use of silicone grease for damping the lateral movement of the pick-up arm by packing such grease around an upright spindle. Because of this it becomes possible therefore to use the simple pivot system in which the pick-up arm is pivoted on the point of an upright pivot pin thereby dispensing with the two separate pivot assemblies such has heretofore has been used. It will be appreciated however that eddy current damping can equally well be applied to a pick-up assembly in which the pick-up arm is pivotally carried in the conventional manner between the arms of a U-shaped support so as to permit of vertical movement and wherein this support is carried on an upright spindle to permit of the lateral movement. It will be apparent if two separate pivot axes are employed in this way, the damping may be arranged to damp movement about either or both of these axes as required.

I claim:

1. In a pick-up arm assembly for a phonograph, the combination of a support, a pick-up, a pick-up arm carrying said pick-up and pivotally mounted on said support for movement about an upright axis so that the pick-up can traverse across a record and for tilting movement about a point on said support so that the pick-up can be lifted off the record, and eddy current damping means comprising a permanent magnet forming part of said support and an electrically conductive element on the pick-up arm, said magnet having a first pole of one polarity extending upwardly on said upright axis with a circular pole piece on said first pole and having further poles of the opposite polarity with pole pieces adjacent said circular pole piece, and said conductive element comprising a part-spherical member having its center at said point on said support and extending downwardly therefrom to surround said circular pole piece lying between that pole piece and said further poles.

2. The combination as claimed in claim 1 wherein, for pivotally supporting the pick-up arm, a pin with a conical upper end is mounted on said magnet to extend upwardly through said circular pole piece and wherein a cooperating element on said arm rests on the tip of said pin and wherein the center of said part spherical element is at the point on said cooperating element engaged by the tip of said pin.

3. The combination as claimed in claim 1 wherein said further poles comprise two poles located on diametrically opposite sides of said circular pole piece, said two further poles being of the same polarity, both being of opposite polarity to said first pole.

4. A pick-up arm assembly for a phonograph comprising a permanent magnet having a first upright pole with a circular pole piece secured on said pole and extending in a horizontal plane and a pair of further poles, both of opposite polarity to said first pole, on diametrically opposite sides of said circular pole piece, an upright pivot pin secured on said first pole and extending upwardly through said circular pole piece, which pivot pin has a conical tip at its upper end, a cooperating element seated on the tip of said pivot pin for rotational movement about the axis of the pivot pin and tilting movement about any horizontal axis, a plate attached to said element and extending radially outwardly therefrom, a part spherical element of electrically conductive material secured on said plate with the center of the part sphere at the point where the tip of the pivot pin engages said cooperating element, said part spherical element extending closely around said circular pole piece and lying between that pole piece and said further poles, a pick-up arm secured on said plate and extending outwardly therefrom, a pick-up head on the outer end of said pick-up arm, a balancing arm secured on said plate and extending outwardly therefrom in the opposite direction to said pick-up arm, and an adjustable balancing weight on said balancing arm.

References Cited

UNITED STATES PATENTS

| | | | |
|---|---|---|---|
| 1,997,636 | 4/1935 | Gattoni | 73—430 X |
| 2,127,878 | 8/1938 | Martin | 33—22.5 |
| 2,315,185 | 3/1943 | Boyle | 73—430 X |
| 2,446,568 | 8/1948 | Wolfe | 33—223 X |
| 2,537,214 | 1/1951 | De Ghilini | 274—23.1 X |
| 2,566,091 | 8/1951 | Masterson | 274—23.1 X |
| 2,676,806 | 4/1954 | Bachman | 274—23 |
| 2,688,456 | 9/1954 | Jensen | 73—430 X |
| 2,941,810 | 6/1960 | Wagner | 274—23.1 X |
| 3,129,008 | 4/1964 | Suzuki et al. | 274—23 |

FOREIGN PATENTS

| | | |
|---|---|---|
| 977,841 | 12/1964 | Great Britain. |

HARRY N. HAROIAN, *Primary Examiner.*